United States Patent [19]

Morimoto et al.

[11] Patent Number: 4,938,372
[45] Date of Patent: Jul. 3, 1990

[54] STORAGE CONTAINER FOR STORING POWDERED OR GRANULAR MATERIALS

[75] Inventors: Kiyoshi Morimoto, Mishima; Akikazu Iwamoto, Shizuoka; Masuo Moriyama, Numazu, all of Japan

[73] Assignees: Kyowa Hakko Kogyo Co., Ltd., Tokyo; Kabushiki Kaisha Matsui Seisakusho, Osaka, both of Japan

[21] Appl. No.: 339,175

[22] Filed: Apr. 14, 1989

[30] Foreign Application Priority Data

Apr. 15, 1988 [JP] Japan .................. 63-051101[U]

[51] Int. Cl.$^5$ ............................................. B65D 83/00
[52] U.S. Cl. ................. 220/20.5; 220/86 R; 206/540
[58] Field of Search ............ 220/20.5, 22, 86 R; 206/528, 535, 540; 414/328

[56] References Cited

U.S. PATENT DOCUMENTS

| | | | |
|---|---|---|---|
| 2,786,595 | 3/1957 | Nelson | 220/20.5 X |
| 2,810,491 | 10/1957 | Goldschmidt | 220/86 R X |
| 2,962,181 | 11/1960 | Nelson | 220/86 R X |
| 4,400,126 | 8/1983 | Desourdy | 414/328 |
| 4,744,492 | 5/1988 | Hackmann et al. | 206/540 X |
| 4,767,258 | 8/1988 | Solvi et al. | 414/328 X |
| 4,805,789 | 2/1989 | Lancesseur et al. | 206/540 X |

Primary Examiner—Steven M. Pollard
Attorney, Agent, or Firm—Koda & Androlia

[57] ABSTRACT

A storage container for storing powdered or granular materials without causing breakage and fragementation thereof includes a storage container body provided with at its upper portion with an a shock absorbing means accommodated therewithin for alleviating the shock of the materials induced thereinto. The shock absorbing means comprises, in a first aspect, a zigzagged shoot includes a plurality of slant plates extended inwardly alternately from its opposed side wall portions, a plurality of outlets formed below said respective slant plates except the lowermost one and a discharge window formed its upper portion. In a second aspect, it comprises a small and a large shock absorbing members configured to a right circular cone with the former being arranged on the upper side of the latter and disposed concentrically below the inlet. The latter has a drop opening formed at it stop portion. In a third apsect, it comprises a shock absorbing member configured to a right circular cone and disposed below the inlet and a plurality of trough members arranged radially projectingly on the foot edge thereof. In a fourth apsect, it comprises a small and a large slant trough members disposed within the storage container body with the former being arranged on the upper side of the latter and located below the inlet therewithin. The latter has a drop opening formed at its portion overlapped by the former.

5 Claims, 7 Drawing Sheets

STORAGE CONTAINER FOR STORING POWDERED OR GRANULAR MATERIALS

BACKGROUND OF THE INVENTION

1. Field of the invention

The present invention relates to a storage container for storing powdered or granular materials which is adapted to be charged efficiently with powdered or granular materials having certain configurations without causing any breakages or fragmentations thereof.

2. Prior Art

In the case that powdered or granular materials having certain configurations such as medicine tablets are stored within a storage container, it is required that they are not subjected to a shock at the time of charging. As a countermeasure therefor, conventionally has been adopted a method in which a shock absorbing member configured to a right circular cone is placed in dropping zone for the powdered or granular materials within the storage container so as to alleviate their shock at the time of charging. However, there is a problem associated with an adoption of such a method. That is, in the storage container having a high storage space, since it is necessary to shorten the dropping distances of the powdered or granular materials by shifting the placement position of the shock absorbing member upwards, a dead space to be not charged with the powdered or granular materials is present below the shock absorbing member in such manner as to become an obstacle to the efficient use of the accommodation capacity of the storage container.

SUMMARY OF THE INVENTION

The present invention is directed to solving the problem noted above, and has for its object to provide a storage container for storing powdered or granular materials which is possible to alleviate the shock of the powdered or granular materials sufficiently at the time of charging as well as to store the powdered or granular materials efficiently by making effective use of a accommodation capacity of the storage container without the formation of dead space therewithin.

For accomplishing the above-mentioned object, in a first aspect of the present invention, a storage container for storing powdered or granular materials comprising, in combination: a zigzagged shoot provided at its upper end with an inlet for inducing powdered or granular materials as well as at its lower end with an outlet for discharging said materials and having a zigzagged passage formed therebetween for guiding the dropping of the materials, a storage container body for storing said powdered or granular materials and accommodating said zigzagged shoot therewithin, a plurality of slant plates extended inwardly downwardly slantly inside said passage alternately from opposed side wall portions of said shoot, a plurality of outlets for discharging said materials formed respectively in said opposed side wall portions below said respective slant plates except the lowermost one, and a window for discharging said materials formed in the upper porion of said shoot.

In a second aspect of the present invention, a storage container for storing powdered or granular materials comprising in combination: a storage container body provided at its upper portion with inlet for inducing powdered or granular materials thereinto, a small and a large shock absorbing members configured to a right circular cone respectively with the former being arranged on the upper side of the latter and disposed concentrically below the inlet of said storage container body therewithin, and an opening for dropping said materials formed in the top portion of said lower large shock absorbing member.

In a third aspect of the present invention, a storage container for storing powdered or granular materials comprising in combination: a storage container body provided at its upper portion with an inlet for inducing powdered or granular materials thereinto, a shock absorbing member configured to a right circular cone and disposed below the inlet of said storage container body therewithin, and a plurality of trough members arranged radially on the circumferential foot edge of said shock absorbing member so as to project outwardly and slantly downwardly.

And in a fourth aspect of the invention, a storage container for storing powdered or granualr materials comprising in combination: a storage container body provided at its upper portion with an inlet for inducing powdered or granular materials thereinto, a small and a large slant trough members disposed within said storage container body with the former being arranged on the upper side of the latter and located below the inlet of said storage container body, and an opening for dropping said materials formed in such a portion of said large trough member as to be overlapped with said upper small trough member.

DETAILED DESCRIPION OF THE INVENTION

Now, preferred embodiments of the present invention will be explained in detail with reference to the drawings hereinafter.

Figure 1:
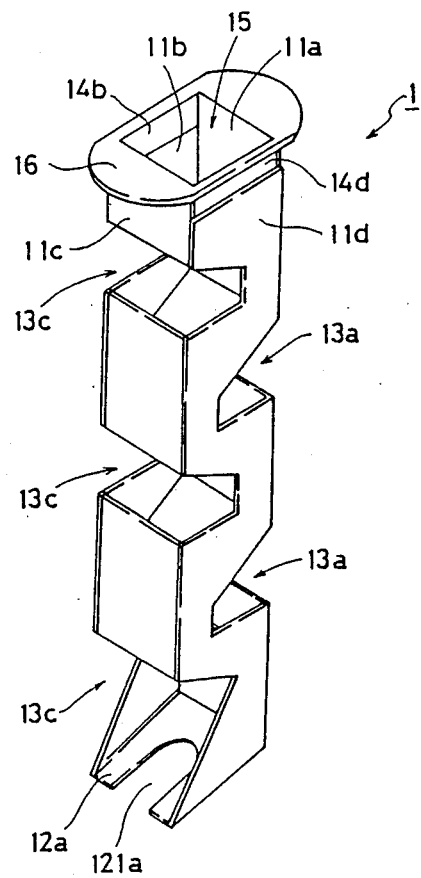
FIG. 1 is a perspective view of a ziazagged shoot to be disposed within a storage container body for storing powdered or granular materials according to a first aspect of the present invention.
Figure 2:
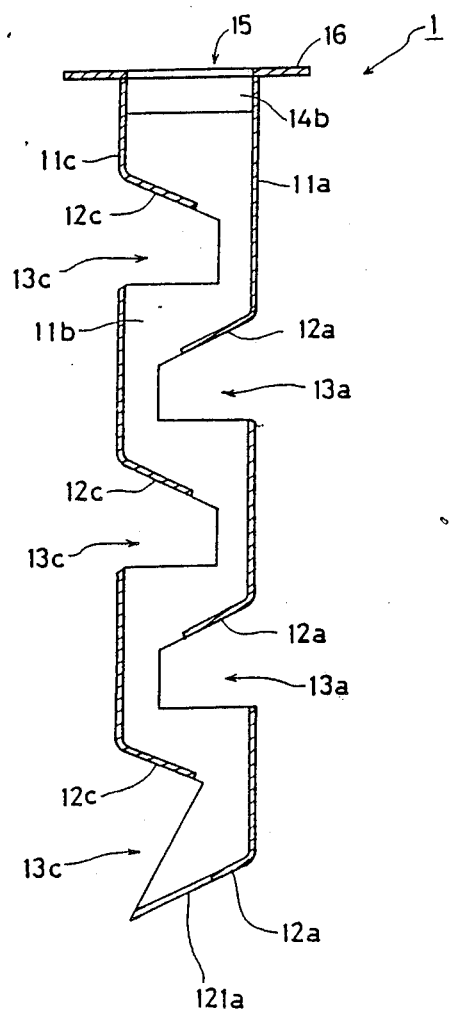
FIG. 2 is a vertical sectional view of the zigzagged shoot shown in FIG. 1.

FIGS. 1 and 2 are a perspective view and a sectional view both of which show a zigzagged shoot as a principal part of a first embodiment according to the present invention.

A zigzagged shoot 1 comprises a square duct provided with four side walls 11a, 11b, 11c, 11d made of synthetic resin plates such as low density polyethylene ones and the like, the opposed side walls 11a, 11c of which are provided with a plurality of slant plates 12a, 12c projected inwardly downwardly slantly alternately therefrom so as to form a zigzagged passage for guiding the dropping of powdered or granular materials. Slant angles of these slant plates 12a, 12c are settled substantially at the same one as an angle of repose so as not to produce a dead space below the respective slant plates 12a, 12c. The projecting lengths of the slant plates 12a, 12c are so settled that the leading end of each slant plate 12a, 12c reaches over the medial plane of the shoot 1 between the opposed side walls 11a, 11c in order to prevent the powdered or granular materials from dropping vertically along the medial plane from the top end to the lowermost end of the shoot 1. The lowermost slant plate 12a is provided with concave cutout portion 121a which is used for insertion of a top portion of a shock absorbing member configured to a right circular cone which will be explained later. And the shoot 1 is provided with a plurality of discharge outlets 13a, 13c below the respective slant plates 12a, 12c except the lowermost one 12a. The discharge outlets 13a on one side wall 11a or of the shoot 1 are formed by cutting out the side wall 11a and both side walls 11b, 11d adjacent thereto, and the discharge outlets 13c on the other side wall 11c of the shoot 1 are formed by cutting out the opposite side wall 11c and both side walls 11b, 11d adjacent thereto. Specifically, each discharge outlet 13a, 13c is formed like a sawtooth in a front view having its upper edge inclined along the slant plate 12a, 12c and its lower edge made horizontal. But, the lowermost discharge outlet 13c has a different configuration from the other ones, namely, it is formed largely by cutting out the side walls 11b, 11d nearly like right-angled triangle respectively. And both these side walls 11b, 11d are provided at their upper end portions with opposed windows 14b, 14d for discharging the powdered or granualr materials respectively. Further, the shoot 1 is provided a its upper end with a flange 16 surrounding the inlet 15 for inducing the powdered or granular materials.

Figure 3:
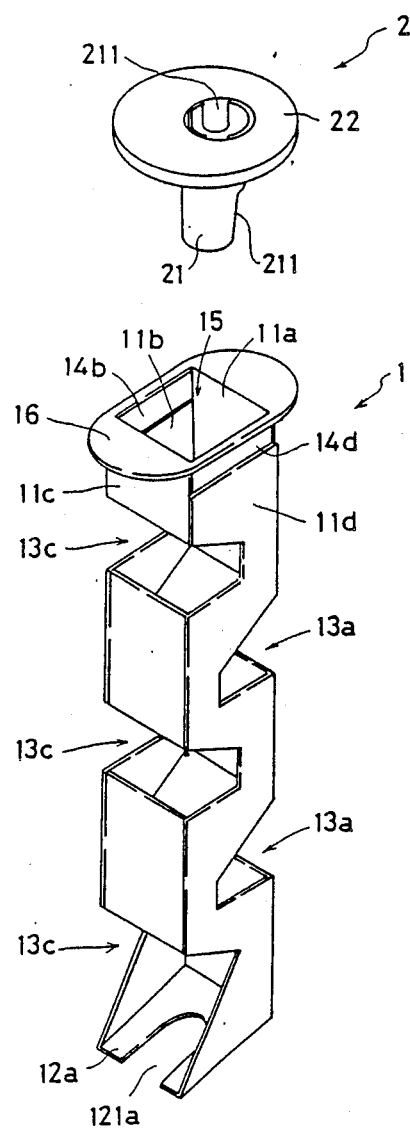
FIG. 3 is an exploded perspective view of the zigzagged shoot provided with an induction member to be inserted thereinto for inducing the powdered or granular materials.
Figure 4:
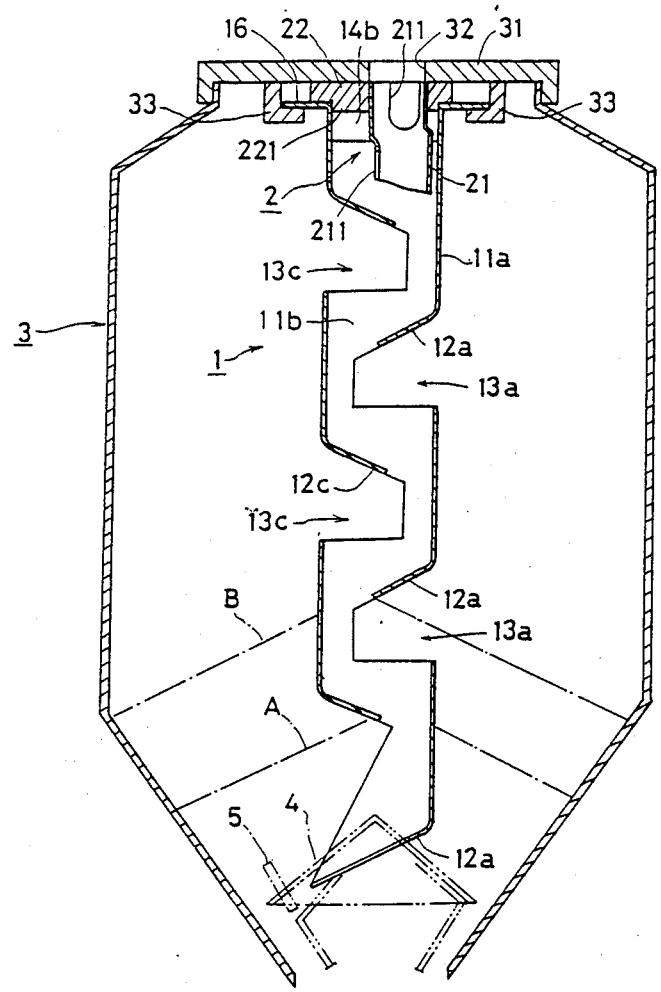
FIG. 4 is a vertical sectional view of a storage container for storing powdered or granular materials according to the first aspect of the present invention.

Into the induction inlet 15 formed at the upper end of the zigzagged shoot 1 constituted as mentioned above, is releasably inserted an induction member 2 for inducing the powdered or granular materials, which has such a preferably configuration as shown in FIGS. 3 and 4. The induction member 2 comprises a support plate 22 and a guide tube 21 fitted into a hole opened in the support plate 22 eccentrically. The guide tube 21 is provided at its upper and lower portions with a plurality of slivered openings 211, for discharging the powdered or granular materials. And the support plate 22 is provided on its underside with a projection 221 to be fitted into the induction inlet 15 formed at the upper end of shoot 1. The induction member 2 is adapted to be inserted into induction inlet 15 so that the lower end of the guide tube 21 is positioned below the discharge windows 14b, 14d formed at the upper end portion of the shoot 1.

Accordingly, as shown in FIG. 4, the storage container for storing the powered or granular materials according to this embodiment is constituted by mounting the zigzagged shoot 1 within the storage container body 3 in such a manner that the projection 221 formed on the underside of the support plate 22 of the induction member 2 is fitted into the induction inlet 15, formed at the upper end of the zigzagged shoot 1 with the guide being inserted into the induction inlet 15, the zigzagged shoot 1 is supported by the shortage container body 3 through a top cover 31 for the body 3 with the flange 16 of the shoot 1 being held at its opposite peripheral portions by means of corresponding support rails 33, 33 projected downwardly from the underside of the top cover 31 on the opposed sides of an inlet opening 32 formed in the top cover 31 for inducing the powdered or granular materials, the support plate 22 of the induction member 2 is fixedly secured to the top cover 31 by means of fasteners, and the concave cutout portion 121a formed in the lowermost slant plate 12a of the zigzagged shoot 1 is fitted onto the top portion of the shock absorbing member 4 configured to a right circular cone and placed on the bottom of the storage container body 3.

According to the storage container for storing the powdered or granular materials constituted as mentioned above, when the powdered or granular materials are supplied through the induction inlet opening 32, they pass through the guide tube 21 of the induction member 2 and then drop tracing the zigzag course formed by the slant plates 12a, 12c so as to be discharged through the lowermost outlet 13c onto the upper surface of the shock absorbing member 4 and stored within the storage container body 3. While the powdered or grnular materials drop tracing the zigzag course in that way, an increase in their dropping speed is prevented so that they are not subjected to a large shock and prevented from being broken or fragmented. Especially, the above-mentioned constitution is advantageous to tablets. And since the powdered or granular materials are adapted to be induced below the discharge windows 14b, 14d formed in the upper end portion of the shoot 1 through the induction member 2, though they are hard tablets having a large coefficient of repulsion, they are repulsed by the uppermost slant plate 12c so as to spring out through the discharge window 14b and hit against the inner surface of the storage container body 3 with alleviating their shock thereupon.

The powdered or granular materials discharged through the lowermost discharge outlet 13c as not above can come around also to the back side of the discharge outlet 13c so as to be heaped up mountainously with keeping an angle of repose on the bottom of the storage container body 3 as shown by a phantom line A in FIG. 4. When the lowermost discharge outlet 13c is stuffed up, the materials are heaped up within the shoot 1. And then, when the materials are heaped up to the lower edge of the discharge outlet 13a second from the lowermost one 13c, they are discharged from the discharge outlet 13a and heaped up mountainously as shown by a phantom line B until the discharge outlet 13a is stuffed up. Thereafter, similarly the powdered or granular materials are discharged from the discharge outlets 13c, 13a in turn from the lower ones so as to be heaped up within the storage container body 3. Meantime, when the uppermost discharge outlets 12a is stuffed up, the powdered or granular materials are heaped up to the upper end of the shoot 1 therewithin so as to stuff up the lower end opening of the guide tube 21 of the induction member 2, they are discharged from the discharge openings 211 of the guide tube 21 and the from the windows 14b, 14d formed at the upper end portion of the shoot 1 to the major peripheral space of the storage container body 3. Accordingly, the powdered or granular materials can be stored within the storage container body 3 almost without gaps. Further, since the respective slant plates 12a, 12c are inclined at the same angle as that of repose or at an angle a little less than that, dead spacesa are not produced below the respective slant plates 12a, 12c.

By the way, in the case that the shock absorbing member 4 configured to a right circular cone is not placed on the bottom of the storage container body 3, as shown in FIG. 4, it is desirable to take such a countermeasure as to prevent the powdered or granular materials from directly hitting against the inner surface of the storage container body 3 by disposing a shock absorbing plate 5 made of synthetic resin such as low density polyethylene and the like in front of the lowermost slant plate 12a as a bottom plate of the zigzagged shoot 1. And as a way for mounting the zigzagged shoot 1 within the storage container body 3, it is needless to say that various kinds of ways can be adopted, for example in one of them, support pins are secured to the underside of the top cover 31 on the opposite sides of the induction inlet opening 32 and the flange 16 of the zigzagged shoot 1 is anchored to the support pins.

Figure 5:
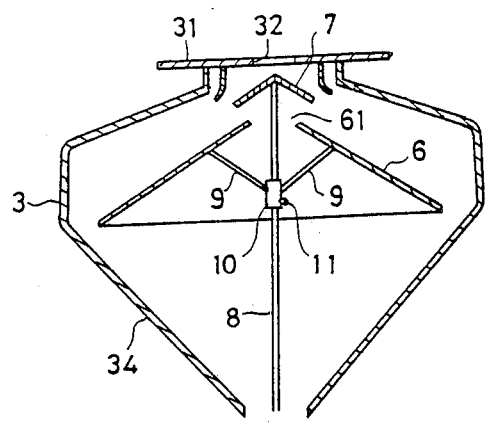
FIG. 5 is a vertical sectional view of an embodiment of a storage container according to a second aspect of the present invention.

FIG. 5 is a vertical sectional view showing embodiment of a storage container according to a second aspect of the invention. In this embodiment, a small and a large shock absorbing members 7, 6 configured to a right circular cone respectively are placed within the storage container body 3 with the former 7 being arranged on the upper side of the latter 6 and positioned concentrically below the induction inlet opening 32 formed in the top cover 31 of the storage container body 3. The upper shock absorbing member 7 is fixedly secured to the top end of a main support pole 8, and the lower shock absorbing member 6 is fixedly secured to branch support rods 9. The branch rods 9 are fixed at their based portions to a slider 10 which is slidably fitted to the main support pole 8 and provided with an anchor screw 11. Accordingly, the distance between the upper and lower shock absorbing members 7, 6 can be adjustably settled by moving the slider 10 vertically and anchoring it with screw 11. The inclinations of the ridge lines of these shock absorbing member 6, 7 are settled at the same angle as that of repose or at an angle a little less than that. And in the top portion of the lower large shock absorbing member 6, there is provided an opening 61 for dropping the powdered or granular materials, of which caliber is smaller than the diameter of the lower end portion of the upper small shock absorbing member 7.

According to the storage container for storing the powdered or granular materials constituted as mentioned above, the materials induced through induction inlet opening 32 firstly hit against the upper shock absorbing member 7 so as to be distributed therearound and to drop onto the lower shock absorbing member 6 and then slide down along the upper surface of the shock absorbing member 6 so as to further drop onto an inclined side walls 34 of the storage container body 3 from the peripheral edge of tdhe member 6 and to be stored within the storage container body 3. Accordingly, in the case that the storage container is used for storing tablets and the like, the tablets are not subjected to a large shock so as to be perfectly prevented from being broken and fragmented. And when the powdered or granular materials are heaped up mountainously with keeping the angle of repose to a level a little higher than the lower shock absorbing member 6 within the storage container body 3, they begin to drop into a void space below the shock absorbing member 6 through through the opening 61 formed in the top portion thereof so that the space can be filled up with them without producing any deed space. When the filling up for the space below the lower shock absorbing member 6 is completed, the powdered or granular materials distributed by the upper shock absorbing member 7 therearound are heaped up again on the materials already heaped up so that the storage container body 3 can be filled up almost without producing any gap therewithin.

Figure 6:
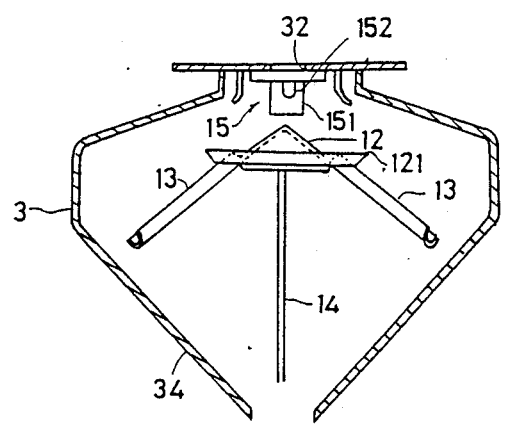
FIG. 6 is a vertical sectional view of an embodiment of a storage container according to a third aspect of the present invention.
Figure 7:
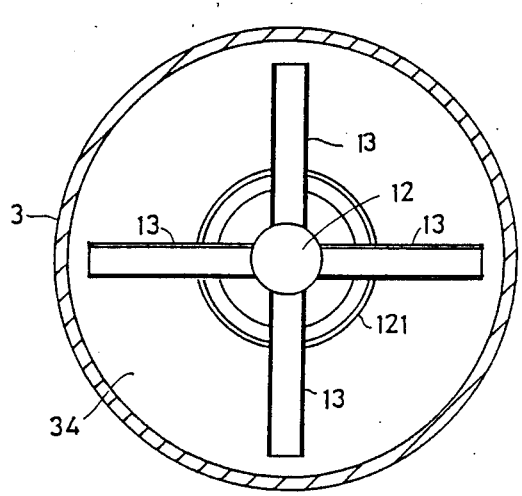
FIG. 7 is a horizontal sectional view of the embodiment shown in FIG. 6.

FIG. 6 is a vertical sectional view showing an embodiment of a storage container according to a third aspect of the invention, and FIG. 7 is a horizontal sectional view of the embodiment. In this storage container, a shock absorbing member 12 configured to a right circular cone is positioned below the inlet opening 32 of the storage container body 3 therewithin, and and a plurality of trough members 13 are arranged radially, (like a cross in this embodiment) on the circumferential foot edge 121 of the shock absorbing member 12 in such a manner as to project outwardly and slantly downwardly. The shock absorbing member 12 is fixedly secured onto the top end of a support pole 14, and the circumferential foot edge 121 is formed in an upright manner so as to dam up the powdered or granular materials. And in the inlet opening 32 for inducing the materials, is mounted an induction member 15 formed substantially similarly to the aforementioned induction member 2 for inducing the materials.

According to the storage container constituted as mentioned above, the powdered or granular materials supplied through the inlet opening 32 firstly pass through the induction member 15 so as to drop onto the shock absorbing member 12 and then slide down along the member 12 so as to be once dammed up by the circumferential foot edge 121. The powdered or granular materials dammed up thereby drop onto an inclined side wall 34 of the storage container body 3 through the trough members 13, so as to be transferred along the inclined side wall 34 and stored within a lower space of the container body 3. Therefore, the shock to which the materials are subjected becomes so remarkably small as to be perfectly prevented from being broken and fragmented. Meantime, when the powdered or granular materials are heaped up till the lower end opening of a guide tube 151 of the induction member 15 is stuffed up, they are adapted to be discharged through discharge opening 152 of the guide tube 151 so that they can be heaped up and stored almost without producing gap within the storage container body 3.

Figure 8:
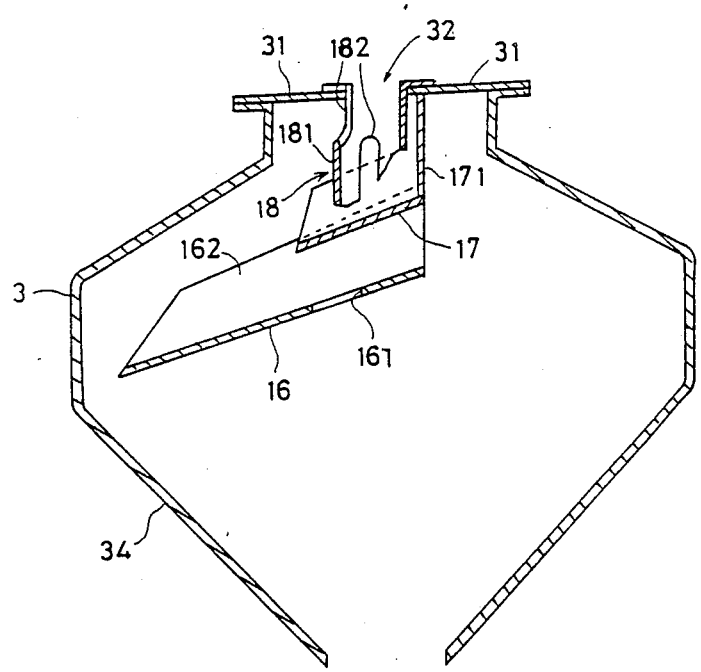
FIG. 8 a vertical sectional view of an embodiment of a storage container according to a fourth aspect of the present invention.

FIG. 8 is a vertical sectional view showing an embodiment of a storage container according to a fourth aspect of the invention. In this storage container, a small and a large trough members 17, 16 are disposed within the storage container body 3 with the former being arranged on the upper side of the latter and positioned below the inlet opening 32 of the container body 3. An opening 161 for dropping the powdered or granular mateirals is formed in such a portion of the large trough member 16 as to be overlapped with the upper small trough member 17. In the inlet opening 32, is mounted an induction member 18 formed substantially similarly to the aforesaid induction member 2. The upper end of the small trough member 17 is closed by a mounting plate 171. By fixedly securing the mounting plate 171 to the top cover 31 of the storage container body 3, the small trough member 14 is disposed below the inlet opening 32. On the other hand, the opposite ends of the large trough member 16 are open, and both side walls 162 thereof are fixedly secured to the upper small trough member 17. The inclinations of these small and large trough members 17, 16 are settled at the same angle as that of repose or at angle a little less than that.

According to the storge container constituted as mentioned above, the pwodered or granular materials supplied through the inlet opening 32 slide down on the upper small trough member 17 and drop onto the lower large trough member 16 from the lower end of the upper member 17. Further they slide down on the lower member 16 and drop onto the inclined side wall 34 of the storage container body 3 from the lower end of the member 16 so as to be heaped up in the lower space of the container body 3. Therefore, the shock to which the powdered or granular materials are subjected becomes so remarkably small as to be perfectly prevented from being broken and fragmented. Meantime, when the powdered or granular materials are heaped up to a level of the leading end of the lower trough member 16, they begin to be heaped up on the trough member 16. When reaching the drop opening 161, they drop through the drop opening 161 so that a void space below the lower trough member 16 is filled up with them. And then, when the drop opening 161 is stuffed up, they are discharged through the upper end of the trough member 16, through the lower end of the upper trough member 17 and further through discharge openings 182 of a guide tube 181 of an induction member 18 in turn from below so that the interior space of the storage container body 3 is filled up with the powdered or granular materials.

Figure 9:
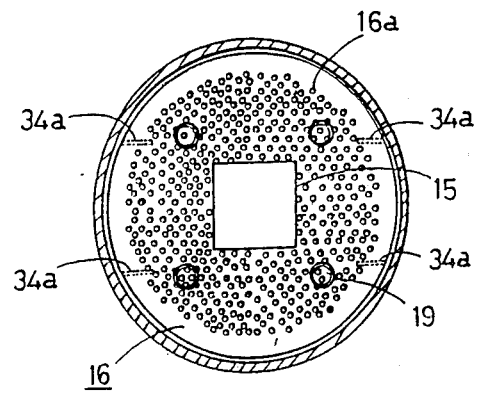
FIG. 9 is a vertical sectional view of another example of zigzagged shoot according to the present invention.
Figure 10:
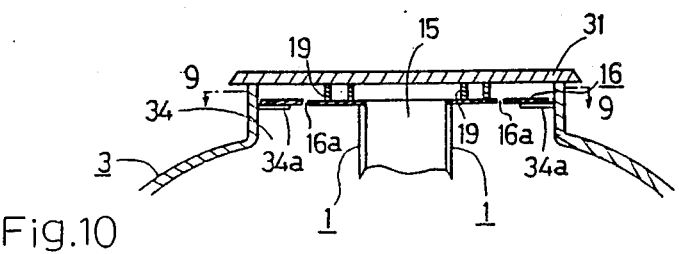
FIG. 10 is a vertical sectional view of a principal part of the storage container showing the mounting condition of the shoot shown in FIG. 9.

FIGS. 9 and 10 are view showing further another embodiment of the present invention.

In this embodiment, the flange 16 of the zigazagged shoot 1 is formed like a disk and is mounted as an inner cover of the storage container body 3 by engaging this flange 16 with four pins 34a projected from as inner circumferential surface of a mouth 34 of the container body 3. The flange 16 is provide with a great number of punched holes 16a for air vent and also provided at its suitable locations (at its four locations spaced apart equidistantly aroound the inlet opening 15 for inducing the powdered or granular materials in this illustrated embodiment) with rubber rings 19 so as to be pressed by the top cover 31 therethrough. Also to this embodiment, it is needless to say that an induction member may be applicable according to demand.

The storage container of this type is particularly effective in the case that the capacity of the storage container is large and the powdered or granular materials are intentionally prevented from being broken and fragmented when the air within the storage container body must be necessarily vented during the transportation.

Some of the many advantages of the present invention should now be apparent. In every storage containers of storing powdered or granular materials according to the first through the fourth aspects of the present invention, since the shock to which the materials are subjected at the time of induction is decreased remarkably, they can be stored without being broken and fragmented within the storage container body. And since the dead space and the like are scarcely produced within the storage container body during the storage of the powdered or granular materials, the storage capacity can be utilized nearly 100% effectively.

In the storage container of the first aspect which has the induction member inserted into the induction inlet formed at the top end of the zigzagged shoot, since the powdered or granular materials are prevented from spring out through the discharge windows formed at the upper portions of the side wall of the zigzagged shoot even through the materials are of a large coefficient of repulsion, they can be perfectly prevented from being broken and fragmented. Especially, this storage container is very effective as a storage container for medicine tablets having a large coefficient of repulsion.

It is understood that the above-described embodiments are only illustrative, and that various modifications and steps may be made by those skilled in the art without departing from the spirit and the scope of the invention as claimed.

What is claimed is:

1. A storage container for storing powdered or granular materials comprising, in combination:
    a zigzagged shoot provided at its upper end with an inlet for inducing powdered or granular materials as well as at its lower end with an outlet for discharging said materials and having a zigzagged passage formed therebetween for guiding the dropping of the materials,
    a storage container body for storing said powdered or granular materials and accommodating said zigzagged shoot therewithin,
    a plurality of slant plates extended inwardly downwardly slantly inside said passage alternately from opposed side wall portions of said shoot,
    a plurality of outlets for discharging said materials formed respectively in said opposed side wall portions below said respective slant plates except the lowermost one, and
    a window of discharging said materials formed in the upper portion of said shoot.

2. A storage container for storing powdered or granular materials according to claim 1, wherein:
    said zigzagged shoot is detachably equipped with an induction member for inducing the materials which includes a guide tube having a plurality of discharge openings formed in its tube wall with said guide tube being inserted into the inlet formed at the top end of the shoot.

3. A storage container for storing powdered or granular materials comprising, in combination:
    a storage container body provided at its upper portion with an inlet for inducing powdered or granular materials thereinto,
    a small and a large shock absorbing members configured to a right circular cone respectively with the former being arranged on the upper side of the latter and disposed concentrically below the inlet of said storage container body therewithin, and
    a opening for dropping said materials formed in the top portion of said lower large shock absorbing member.

4. A storage container for storing powdered or granular materials comprising, in combination:
    a storage container body provided at its upper portion with an inlet for inducing powdered or granular materials thereinto,
    a shock absorbing member configured to a right circular cone and disposed below the inlet of said storage container boby therewithin, and a plurality of trough members radially on the circumferential foot edge of said shock absorbing member so as to project outwardly and slantly downwardly.

5. A storage container for storing powdered or granular materials comprising, in combination:
 a storage container body provided at its upper portion with an inlet for inducing powdered or granular materials thereinto,
 a small and a large slant trough members disposed within said storage container body with the former being arranged on the upper side of the latter and located below the inlet of said storage container body, and
 an opening for dropping said materials formed in such a portion of said large trough member as to be overlapped with said small trough member.

* * * * *

UNITED STATES PATENT AND TRADEMARK OFFICE
CERTIFICATE OF CORRECTION

PATENT NO. : 4,938,372

DATED : July 3, 1990

INVENTOR(S) : MORIMOTO et al.

It is certified that error appears in the above-identified patent and that said Letters Patent is hereby corrected as shown below:

On Title page:

Column (75) Inventors: Change "Kiyoshi Morimoto, Mishima; Akikazu Iwamoto, Shizuoka; Masuo Moriyama, Numazu, all of Japan" to --Kiyoshi Morimoto, Shizuoka, Japan; Akikazu Iwamoto, Shizuoka, Japan; Masuo Moriyama, Shizuoka, Japan; Junji Nakagawa, Osaka, Japan--

Signed and Sealed this

Fifth Day of November, 1991

*Attest:*

HARRY F. MANBECK, JR.

*Attesting Officer*  *Commissioner of Patents and Trademarks*